United States Patent

Utley

[15] 3,653,037

[45] Mar. 28, 1972

[54] APPARATUS AND A METHOD FOR AUTOMATICALLY TESTING A SYSTEM WHICH RECEIVES AN ANALOG INPUT SIGNAL

[72] Inventor: Brian G. Utley, Boca Raton, Fla.

[73] Assignee: International Business Machines Corporation, Armonk, N.Y.

[22] Filed: Dec. 31, 1969

[21] Appl. No.: 889,440

[52] U.S. Cl. ..........340/347 AD, 324/74
[51] Int. Cl. ..........H03k 13/02
[58] Field of Search ..........340/347 AD

[56] References Cited

OTHER PUBLICATIONS

Barbera W. Stepheson, Analog-Digital Conversion Handbook, 1964, Digital Equipment Corporation, Maynard, Mass. pages, 64 & 65

*Primary Examiner*—Maynard R. Wilbur
*Assistant Examiner*—Robert F. Gnuse
*Attorney*—Hanifin and Jancin and J. Jancin, Jr.

[57] ABSTRACT

A testing system which periodically applies an analog test signal to an input storage capacitor and converts the value of the voltage stored on the capacitor to a digital number which is compared with an original digital test signal. Failure of the capacitor, an analog-to-digital converter or an intervening amplifier is detected by the comparator because the two signals will not agree. An error signal is generated by the comparator in the event of such a failure.

3 Claims, 2 Drawing Figures

INVENTOR
BRIAN G. UTLEY

BY J. Tancin Jr.

ATTORNEY

APPARATUS AND A METHOD FOR AUTOMATICALLY TESTING A SYSTEM WHICH RECEIVES AN ANALOG INPUT SIGNAL

BACKGROUND OF THE INVENTION

1. Field of the Invention

The invention relates to the field of methods and apparatus for automatically testing a system which receives an analog input signal. The system is checked while operating, in order to assure that the system is working properly.

2. Description of the Prior Art

Systems are known in the prior art which generate a digital test function and pass it through a digital-to-analog converter to develop an equivalent analog test function. The input of a part of an analog system to be checked is connected to the output of the digital-to-analog converter and the output of the analog system is connected to an analog-to-digital converter. The output of the analog-to-digital converter is then passed through a digital arithmetic unit which performs the inverse function of the function performed by the analog system under test. The output of the arithmetic unit is then compared with the digital test signal to determine whether the analog device is operating properly. In the event that the test system detects that the analog system is not operating properly, an error signal is generated by the comparator.

In such prior art test systems the test performed is not sufficient to detect all failures of the system being checked. This can lead to major problems, since if a process is being controlled, an undetected failure in the system can result in a process being driven out of its acceptable range because it appears to the control computer that the process is not operating properly. Process control applications need a system which is certain to control the process correctly, if the signal from the sensors which sense the state of the process are correct. In addition, the prior art does not provide for the isolation of the analog system where the analog-to-digital converter constitutes an unacceptable load on the analog device.

The primary object of the present invention is to assure that the conversion of the analog input voltage to a digital number is accurately performed.

Another object of the present invention is to perform a test which checks the entire system from the analog input terminals through the end of the analog-to-digital conversion, and which will detect a failure of the system while the system is operating.

A still further object of the invention is to prevent a failure of the analog input system from causing the control computer to act as though the failure were in the process being controlled, rather than in the control system.

Still another object of the invention is to provide a test for analog input systems which does not unduly load the analog system.

Still another object of the invention is the provision of a method of testing an input system which assures that the system correctly processes the input signal received.

SUMMARY

The invention achieves its objects by the manner in which it interconnects a test signal generator, an analog input system to be checked, and a comparator for determining whether the system is operating properly, and by using a test signal which is expected to produce the same output as the data previously received.

The test signal generator provides a digital signal and its analog equivalent as outputs. The analog test signal can be applied to an input storage capacitor, while the capacitor is otherwise isolated. The capacitor is then switched to an input of an analog-to-digital converter. The same analog-to-digital converter is also used for converting an analog data input to a digital number for processing. The output of the analog-to-digital converter is compared with a digital test signal supplied by the test signal generator. In the event that these two signals differ by more than an allowed tolerance, an error signal is generated. The digital test signal is controllable, in order to test the system with the voltages that the analog input is supplying to the system during the nontest portion of the machine cycle.

Figure 1:
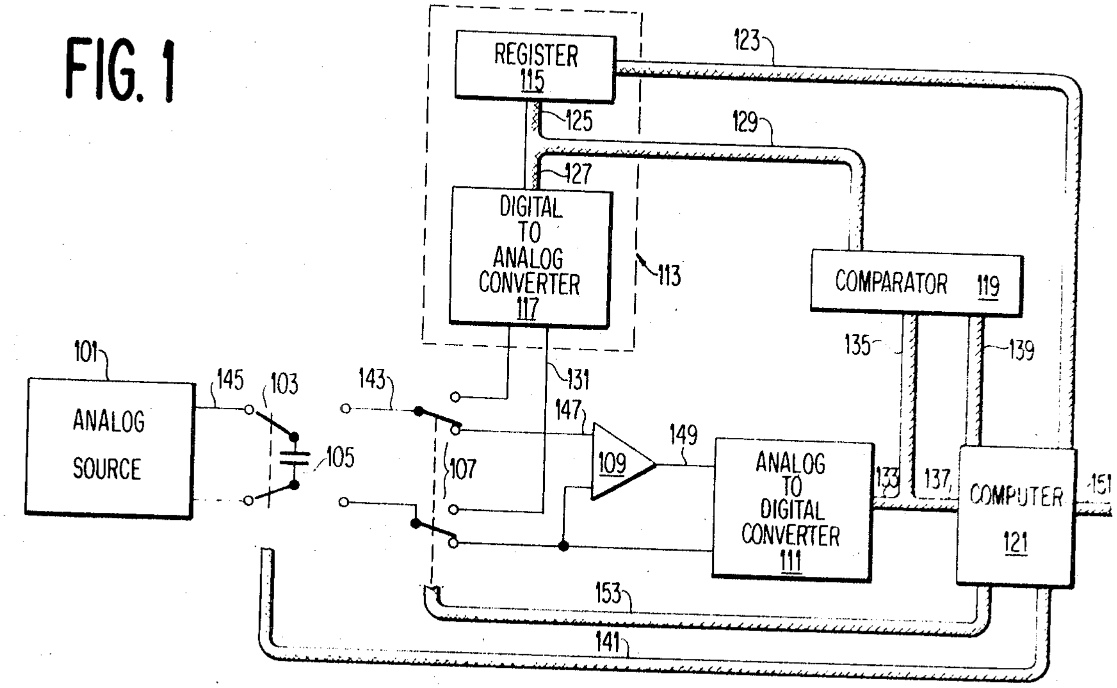
FIG. 1 is a block diagram of the preferred embodiment of the present invention showing a single analog input source.

DESCRIPTION OF THE PREFERRED EMBODIMENT:

The preferred embodiment of the present invention is shown in FIG. 1. An analog input source 101 is connected to the input storage capacitor 105 through cable 145 by an input switch means 103 in a first position. In a second position, the input switch means 103 connects the capacitor 105 to cable 143. Cable 143 is connected to the common terminal of the DPDT test switch 107 and is connected to an input to an amplifier 109 or to a test signal generator 113 depending on the position of a test switch 107. When the input switch 103 is in its second position, and the test switch is in its first position, the capacitor 105 is connected through cable 131 to an analog output of the test signal generator shown generally at 113. When the input switch 103 is in its second position, the capacitor 105 is connected to the input of amplifier 109 through cable 147.

The output of amplifier 109 is connected to the input of an analog-to-digital converter 111 by cable 149.

The preferred embodiment of the test signal generator shown generally at 113 is comprised of two components, a register 115 and a digital-to-analog converter 117. The output of the register 115 is presented on the cable 125. This is connected to the input of the digital-to-analog converter 117 by the cable 127. The output of the digital-to-analog converter 117 is presented on cable 131 and forms the analog output of the test signal generator 113. The register 115 may receive information from a computer 121 over a cable 123. The output of the register 115 on cable 125 is connected to a comparator 119 by a cable 129.

The output of the analog-to-digital converter 111 is presented on cable 133 and is connected to the computer 121 by cable 137 and is also connected to a second input of the comparator 119 by cable 135.

A cable 139 interconnects the comparator 119 and the computer 121 to provide two way communication between the comparator and the computer.

A cable 141 from computer 121 to input switch 103 enables the computer 121 to switch input switch 103 as needed. A cable 153 from the computer 121 to the test switch 107 enables the computer 121 to switch test switch 107 as needed. Cable 151 from computer 121 is for communication with other equipment, which may include another computer.

OPERATION OF THE PREFERRED EMBODIMENT OF THE INVENTION

When the system is operating in a non-test mode, the analog input source 101 is connected to the input storage capacitor 105 by the input switch 103 in its first position. When the computer needs to know the voltage supplied by the analog source 101, a signal is transmitted down cable 141 to switch input switch 103 to its second position. In its second position, switch 103 connects the voltage across capacitor 105 to cable 143 and to cable 147 through test switch 107, the test switch 107 being in its second position. Thus the voltage across capacitor 105 is connected to the input of amplifier 109. The output of amplifier 109 is connected to the input of analog-to-digital converter 111 by cable 149. The amplifier 109 amplifies the voltage across the capacitor 105 and feeds it to the analog-to-digital converter 111. The analog-to-digital converter provides an output on cable 133. The output on cable 133 is the digital equivalent of the voltage presented at the input of the analog-to-digital converter. The output of the analog-tosdigital converter is carried to the computer over cable 137. The computer 121 then processes the information.

When the system is operating in the test mode, the capacitor 105 is connected to the cable 143 by input switch 103 which is in its second position. A signal is transmitted down a cable 153 to switch test switch 107 to its first position, thus connecting capacitor 105 to the output of the test signal generator 113 through cables 143 and 131 and the test switch 107. A test value is impressed on register 115 by the computer 121 through cable 123, or register 115 has a built-in test value. Register 115 can be in the computer 121, if desired. The test value in register 115 is presented at its output on cable 125. The test value is transmitted to the digital-to-analog converter 117 along cable 127 and is also transmitted to the comparator 119 over cable 129. The digital-to-analog converter 117 converts the digital test signal presented at its input on cable 127 to an analog equivalent which is presented at its output on cable 131. The capacitor 105 charges to the analog test voltage, if the capacitor is operating properly. The test switch 107 is then switched to its second position, connecting capacitor 105 to the input of amplifier 109 through cable 143, test switch 107, and cable 147. The output of the amplifier 109 constitutes the input to the analog-to-digital converter 111. The analog-to-digital converter converts this analog value to a digital checking signal which is presented on the output cable 133. The digital checking signal on the output cable 133 is transmitted to the comparator 119 along cable 135. The comparator compares the digital test signal value which was presented to it on cable 135 and the digital checking signal. If the two signals agree within the required tolerance, the comparator 119 signals the computer 121 over cable 139 that the signals agree. In the event that the signals do not agree with the required tolerance, the comparator 119 signals the computer 121 over cables 139 that an error is detected. In an alternate embodiment the difference between the numbers can be transmitted to the computer, or the computer can do the comparison. What the computer 121 will do in the event that an error is detected will depend on the environment in which the input system is being used. The computer can rerun the same test, can rerun the test with another value, can check to find out what the difference between the two signals is, or it can signal an operator to check and correct the failure. Which of these courses or others will be followed will be determined when the computer is set up, since the choice depends on the results needed.

The preferred method of testing is to receive an analog data input signal from source 101 and convert that signal to a digital data signal through the normal input conversion sequence. Then a digital test signal is generated which is equivalent to the analog data input signal which is expected to provide the digital data signal output received. This value is impressed on register 115 as the digital test signal. This digital test signal is converted to an analog test signal by the digital-to-analog converter 117. The analog test signal is sent to input capacitor 105 by switching input switch 103 to its second position and test switch 107 to its first position. After the capacitor 105 has charged to the analog test value, test switch 107 is switched to its second position and the analog test value on the capacitor 105 is passed through the input system and converted to a digital checking signal as described. Comparator 119 compares the digital test signal on cable 129 with the digital checking signal on cable 135. An error or no error signal is transmitted to the computer 121 by the comparator 119. This method of testing the system is preferred because it insures that the value used during the test is very close to the value being converted during the data portion of the machine cycle. This avoids the situation where the test signal is in a range which is properly converted, but the input value is in a range which is not properly converted. Such situations could arise in several ways. The test value could be in a range which is properly converted, while the analog input source value is below the noise level of the amplifier 109, thus producing a faulty input conversion. Another possibility would be faulty analog-to-digital conversion at one input level.

Alternately, if desired, the test system can be set up to test the input system with a unique voltage, either unrelated to the input level of the data, or derived from the data level, but being different than the data level.

The tolerance to which the comparator 119 compares its two input signals can be either built in or impressed by an outside source such as the computer 121. There are a number of ways of providing the tolerance desired, two of which are 1) comparing only the higher order bits of the answers, leaving at least one bit not compared, thereby providing a tolerance, or 2) by subtracting one number from the other in the comparator and comparing the absolute value of the answer with the tolerance.

The form of the test signal generator is not important. Any test signal generator which provides a digital test signal to comparator 119 and its analog equivalent to test switch 107 will satisfy the requirements of this invention.

The comparator 119 and/or part or all of the test signal generator 113 may be incorporated in the computer 121.

The computer 121 may either be the computer to which the input system is attached, or it may be a special purpose control system which is part of the input unit, in which case the output cable 151 would be connected to the main computer.

It is not necessary that the digital output of the test signal generator 113 and the output of the analog-to-digital converter be permanently connected to the comparator. A permanent connection is shown in the figures for convenience, but switches or gates can disconnect the test signal generator 113 and the analog-to-digital converter from the input of the comparator except at the times information must be transmitted to the comparator by the device.

In the event that the analog input source 101 is a or similar device and there is a problem of having an open analog input source 101, a voltage different from that received as data from the source 101 can be impressed on the capacitor 105 as in a test sequence. Then rather than connecting the capacitor to the analog-to-digital converter 111, the capacitor can be connected to the input source 101 by switching the input switch 103. Test switch 107 can then be switched to its second position and input switch 103 can be switched back to its second position. If the value received as data in this conversion is the same as the value impressed on the test signal, then the input source is open.

In the event that it is felt to be desirable to be able to watch the input capacitor 105 charge from the test signal generator, in order to characterize the condition of the capacitor or the test signal, the test switch means 107 can be provided with the ability to connect the test signal generator to the capacitor 105 while the capacitor is also connected to the input to the analog-to-digital converter 111. In this way a deteriorating capacitor or test signal generator may be detected prior to failure.

DESCRIPTION OF AN ALTERNATE EMBODIMENT

Figure 2:
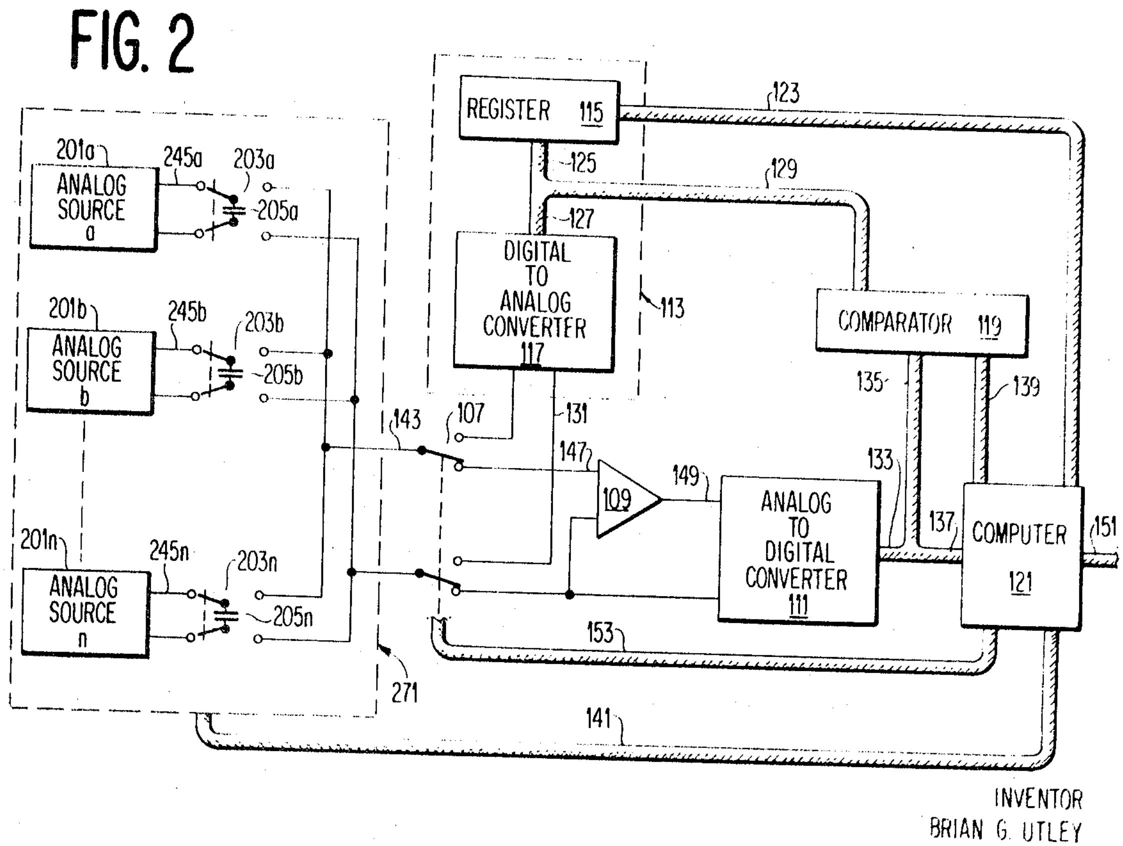
FIG. 2 is a block diagram of the preferred embodiment of the invention showing more than one analog input source.

An alternate embodiment of the invention is shown in FIG. 2. The system shown in FIG. 2 is the same as the system shown in FIG. 1 except for the input system shown generally at 271. This input system provides for having more than one analog input source and functions as a multiplexer in providing the ability to connect any of the capacitors 205*a*–205*n* to the converting or testing systems. Each of the input systems *a*, *b*, ... and n is identical to the input system 101, 145, 103, 105 in FIG. 1. The only difference is that the switches 203*a*, 203*b*, ... 203*n* are selectively switched by the computer with a control signal coming over cables 141. The connections between the cable 141 and the individual switches 203*a*, 203*b*, ... 203*n* have been omitted from the drawings for clarity. Each pair of switches 203*a*, 203*b*, ... 203*n* may be switched individually or in combination, as desired by the computer 121.

OPERATION OF THE ALTERNATE EMBODIMENT

To convert an analog input source voltage to a digital value, say source (*i*) , the switch **203*i* associated with that input source is switched to its second position thus connecting it to cable 143 as was described in connection with FIG. 1. The conversion of the value proceeds as described previously in connection with the embodiment of FIG. 1. To test on a given capacitor, say capacitor 205*i*, the switch 203*i* is switched to its second position and the test proceeds in the same manner as described in connection with the embodiment of FIG. 1**.

This multiple input system provides one additional advantage over the system of FIG. 1. This advantage is that when an error is detected, a different capacitor may be switched into the test system to determine whether the capacitor in the previous test was at fault. This provides one diagnostic test for use in determining what component has failed when an error is detected.

The present invention has the advantage of providing the ability to do an on line verification of the proper operation of the input system, interleaved with data input cycles of the input system, thus assuring the accuracy of the input data conversion.

What is claimed is:

1. In an apparatus having a multiplexer including a plurality of inputs, each of said inputs having an associated capacitor and an associated input switch means, a first terminal of each input switch means being connected to its associated capacitor, a second terminal of each input switch means being connected to its associated input, a third terminal of each input switch means being connected together at a node, said node being connected to an input of an amplifier, each of said input switch means connecting its associated capacitor to its associated input when said input switch means is in a first position and connecting its associated capacitor to said input of said amplifier when said input switch means is in a second position, said apparatus further including an analog-to-digital converter having an input connected to an output of said amplifier, a testing system for testing each of said input switch means, each of said capacitors, said amplifier, and said analog-to-digital converter, said system comprising:
   - a test signal generator for providing an analog signal output and a digital signal output, said analog and digital signals being equivalent;
   - a test switch means connected between said node and said input of said amplifier, said test switch means having a first terminal connected to said node, a second terminal connected to said analog signal output of said test generator, and a third terminal connected to said input of said amplifier, said test switch means connecting said node to said analog signal output of said test signal generator when said test switch means is in a first position, said test switch means connecting said node to said input of said amplifier when said test switch means is in a second position;
   - a comparison means having an input connected to an output of said analog-to-digital converter and another input connected to said digital signal output of said test generator;
   - a control means connected to said comparison means, to each of said input switch means, and to said test switch means;

said control means placing any selected one of said input switch means in the second position and said test switch means in the first position for charging the capacitor associated with said input switch means with said analog signal output of said test signal generator, said control means thereafter placing said test switch means in the second position causing said capacitor associated with said input switch means to be connected to said input of said amplifier, and said control means thereafter enabling said comparison means to provide an error indication if said output of said analog-to-digital converter differs from said digital signal output of said test signal generator by more than a predetermined tolerance.

2. In an apparatus having a multiplexer including a plurality of inputs, each of said inputs being connected to an analog sensor, each of said inputs having an associated capacitor and an associated input switch means, a first terminal of each input switch means being connected to its associated capacitor, a second terminal of each input switch means being connected to its associated input, a third terminal of each input switch means being connected together at a node, said node being connected to an input of an amplifier, each of said input switch means connecting its associated capacitor to its associated input when said input switch means is in a first position and connecting its associated capacitor to said input of said amplifier when said input switch means is in a second position, said apparatus further including an analog-to-digital converter having an input connected to an output of said amplifier, a testing system for testing each of said input switch means, each of said capacitors, said amplifier, and said analog-to-digital converter, said system comprising:
   - a test signal generator for providing an analog signal output and a digital signal output, said analog and digital signals being equivalent;
   - a test switch means connected between said node and said input of said amplifier, said test switch means having a first terminal connected to said node, a second terminal connected to said analog signal output of said test generator, and a third terminal connected to said input of said amplifier, said test switch means connecting said node to said analog signal output of said test signal generator when said test switch means is in a first position, said test switch means connecting said node to said input of said amplifier when said test switch means is in a second position;
   - a comparison means having an input connected to an output of said analog-to-digital converter and another input connected to said digital signal output of said test generator;
   - a control means connected to said comparison means, to each of said input switch means, and to said test switch means;

said control means placing any selected one of said input switch means in the second position and said test switch means in the first position for charging the capacitor associated with said input switch means with said analog signal output of said test signal generator, said control means thereafter placing said input switch means in the first position causing said capacitor associated with said input switch means to be connected to said input associated with said input switch means, said control means thereafter placing said test switch means in the second position, said control means thereafter placing said selected one of said input switch means in the second position causing said capacitor associated with said input switch means to be connected to said input of said amplifier, and said control means thereafter enabling said comparison means to provide an error indication if a comparison of said output of said analog-to-digital converter and said digital signal output of said test signal generator indicates a difference from what is anticipated, said error indication indicating a faulty analog sensor.

3. In an apparatus having a multiplexer including a plurality of inputs, each of said inputs being connected to an analog, each of said inputs having an associated capacitor and an associated input switch means, a first terminal of each input switch means being connected to its associated capacitor, a second terminal of each input switch means being connected to its associated input, a third terminal of each input switch means being connected together at a node, said node being connected to an input of an amplifier, each of said input switch means connecting its associated capacitor to its associated input when said input switch means is in a first position and connecting its associated capacitor to said input of said amplifier when said input switch means is in a second position, said apparatus further including an analog-to-digital converter having an input connected to an output of said amplifier, a testing system for testing each of said input switch means, each of said capacitors, said amplifier, and said analog-to-digital converter, said system comprising:

a test signal generator for providing an analog signal output and a digital signal output, said analog and digital signals being equivalent;

a test switch means connected between said node and said input of said amplifier, said test switch means having a first terminal connected to said node, a second terminal connected to said analog signal output of said test generator, and a third terminal connected to said input of said amplifier, said test switch means connecting said node to said analog signal output of said test signal generator when said test switch means is in a first position, said test switch means connecting said node to said input of said amplifier when said test switch means is in a second position;

a comparison means having an input connected to an output of said analog-to-digital converter and another input connected to said digital signal output of said test generator;

a control means connected to said comparison means, to each of said input switch means, and to said test switch means;

said control means placing any selected one of said input switch means in the second position and said test switch means in the first position for charging the capacitor associated with said input switch means with said analog signal output of said test signal generator, said control means thereafter placing said test switch means in the second position causing said capacitor associated with said input switch means to be connected to said input of said amplifier, said control means thereafter enabling said comparison means to provide an error indication if said output of said analog-to-digital converter differs from said digital signal output of said test signal generator by more than a predetermined tolerance, said control means thereafter placing said selected one of said input switch means in the first position causing said capacitor associated with said input switch means to be connected to said input associated with said input switch means, said control means thereafter placing said selected one of said input switch means in the second position causing said capacitor associated with said input switch means to be connected to said input of said amplifier, and said control means thereafter enabling said comparison means to provide an error indication if a comparison of said output of said analog-to-digital converter and said digital signal output of said test signal generator indicates a difference from what is anticipated, said error indication indicating a faulty analog sensor.

* * * * *